United States Patent
Zubovsky

(10) Patent No.: US 8,020,007 B1
(45) Date of Patent: Sep. 13, 2011

(54) SYSTEM AND METHOD FOR OBTAINING IDENTITIES

(75) Inventor: Valery Zubovsky, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 776 days.

(21) Appl. No.: 12/151,630

(22) Filed: May 7, 2008

(51) Int. Cl.
*G06F 5/00* (2006.01)
*H04L 9/00* (2006.01)

(52) U.S. Cl. ............... 713/189; 726/5; 726/9; 713/180; 713/193; 705/50

(58) Field of Classification Search .............. 713/172, 713/176, 180, 181, 189, 192, 193; 726/5, 726/9, 10, 20; 705/50
See application file for complete search history.

(56) References Cited

U.S. PATENT DOCUMENTS

| | | | |
|---|---|---|---|
| 7,249,373 B2* | 7/2007 | Shewchuk et al. | 726/5 |
| 2002/0091928 A1* | 7/2002 | Bouchard et al. | 713/178 |
| 2002/0107891 A1* | 8/2002 | Leamon et al. | 707/513 |
| 2004/0181469 A1* | 9/2004 | Saeki | 705/30 |
| 2005/0131583 A1* | 6/2005 | Ransom | 700/295 |
| 2006/0015727 A1* | 1/2006 | Birk et al. | 713/171 |
| 2009/0125972 A1* | 5/2009 | Hinton et al. | 726/1 |

* cited by examiner

*Primary Examiner* — Kim Vu
*Assistant Examiner* — Sayed Beheshti Shirazi
(74) *Attorney, Agent, or Firm* — Innovation Partners; Charles E. Gotlieb

(57) ABSTRACT

A system and method identifies one of several security token services that can be used to convert an identity token into one containing content, a format and having a signature corresponding to a signing key name that a software service can use. The identification of the security token service that may be used to perform the conversion is made using machine readable information about the signing key name that the software service can use.

21 Claims, 3 Drawing Sheets

SYSTEM AND METHOD FOR OBTAINING IDENTITIES

RELATED APPLICATION

This application claims the benefit of U.S. Provisional Application Ser. No. 61/126,632, entitled, "Method and Apparatus for Obtaining Identities", filed by Valery Zubovsky on May 5, 2008, having the same assignee as this Application and is hereby incorporated by reference in its entirety.

FIELD OF THE INVENTION

The present invention is related to computer software and more specifically to computer software for authentication.

BACKGROUND OF THE INVENTION

To perform functions on a computer system, different services may be used. A service may correspond to a computer program, or to a functional part of a computer program. Different services may have been developed independently of one another, and each service may have different ways of authenticating users of that service. When the user of one service wishes to use a different service, a different manner of authentication may be necessary, requiring the user to authenticate himself or herself to the second service using an entirely different method than is used to authenticate the same user to a first service. This makes it cumbersome for users to remember, if the formats for authentication are different. For example, one service may require an account identifier and a password, while another service requires an e-mail address and a password.

It can be more annoying when the user has already authenticated himself or herself to one service used by a company, and the user must reauthenticate himself or herself to each service the user uses from the same company. This is because the customer expects that a single authentication would suffice, and can be annoyed by the reauthentication that may be required to perform different tasks within the same corporation.

Even though the authentication information may be the same from one service to the next, the user may nevertheless be required to reauthenticate himself when using different services if the different services use different formats to store the same information. Although it would be possible to write conversions of the formats from one format to the other, if there are many such services using many different formats, the possible permutations can be large, making such conversions a logistical problem. If authentication information is provided as a signed token, even the same information stored in the same format may have different signatures, depending on the service using the token, and this adds to the number of permutations that must be accommodated.

Conventional security token services can be used to perform such conversions of signed tokens containing identity information. However, there may be more than one such service in use. Determining which security token service is capable of performing the proper conversion would again require a list of possible permutations and the security token service to use to implement each conversion for each permutation. Such a list can grow to a large size if the number of services is large and keeping the list in synchronization with the capabilities of each security token service can be error prone and cumbersome.

What is needed is a system and method that can allow a user of a computer service who has authenticated himself or herself to that service to use other services without reauthentication when multiple security token services are in use, without maintaining complex lists of the capabilities of each security token service.

SUMMARY OF INVENTION

When a first service provides a signed identity token to be used to authenticate the corresponding user by a second service, a system and method selects from multiple conventional security token services to use for any required conversion by identifying the signing key name required by the second service. The signing key name required by each service may be contained in a machine readable format that allows the exact location of the signing key name to be readily ascertained, such as a conventional Web services policy. The security token services are configured to allow a given security token service to handle all conversions that result in the same signing key name.

In one embodiment, the content, format and signing key name of the token provided by the first service are compared with those used by the second service to allow the system and method to determine if the signed identity token from the first service may be used unchanged by the second service. If so, the identity token is provided to the second service unconverted.

DETAILED DESCRIPTION OF A PREFERRED EMBODIMENT

Figure 1:
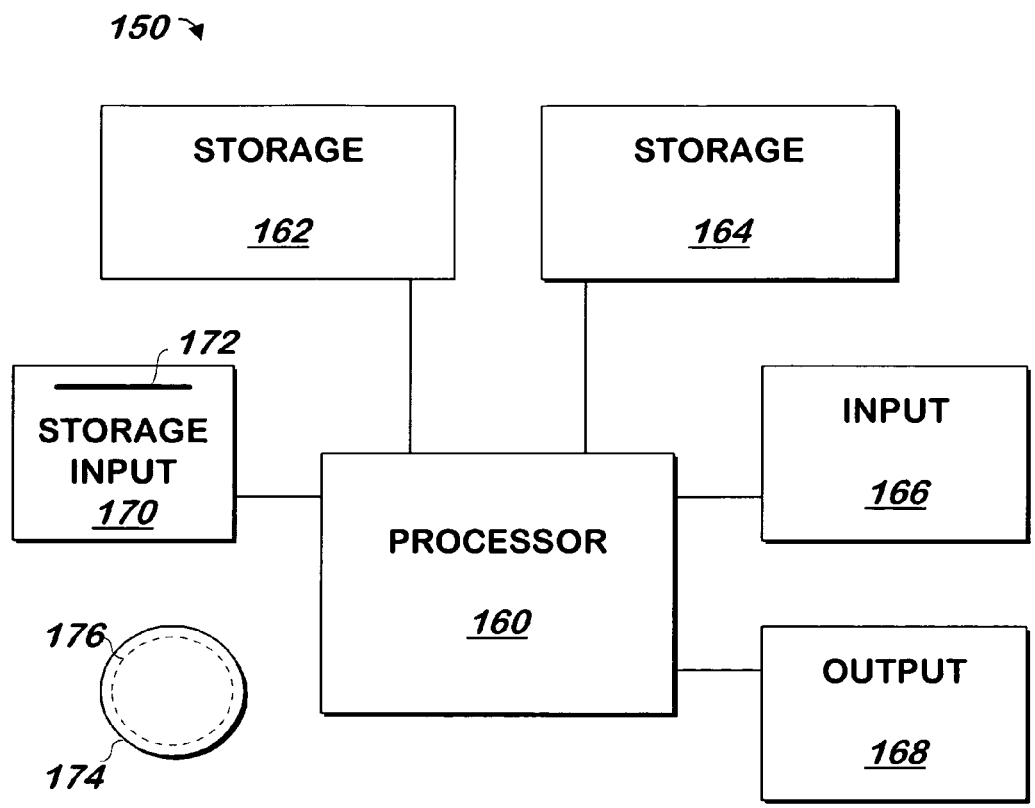
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the MOZILLA browser commercially available from the MOZILLA FOUNDATION of Mountain View, Calif. or INTERNET EXPLORER browser commercially available from MICROSOFT above, although other systems may be used.

Figure 2:
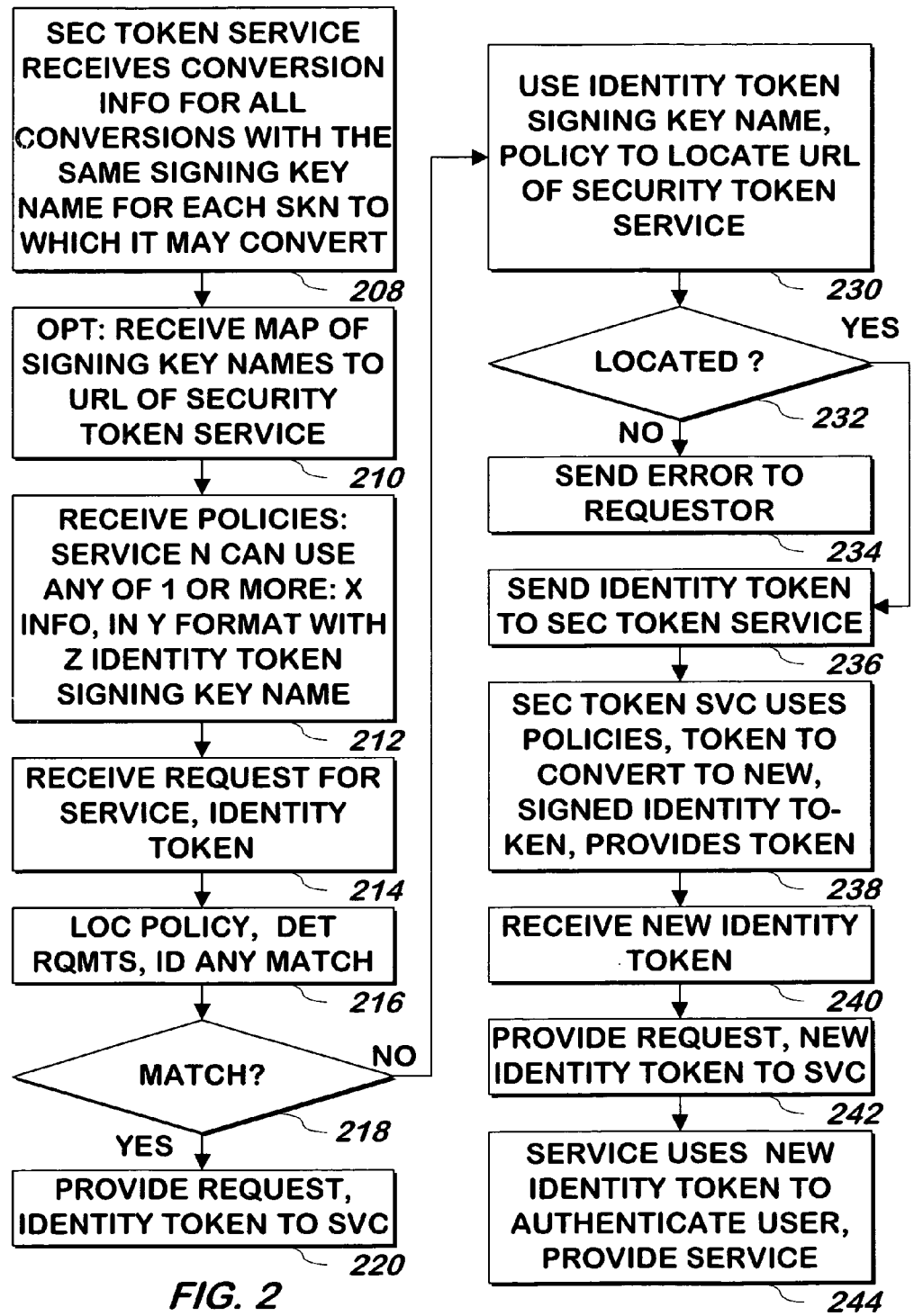
FIG. 2 is a flowchart illustrating a method of providing identity information according to one embodiment of the present invention.

Referring now to FIG. 2, a method of providing identity information is shown according to one embodiment of the present invention.

Each of several conventional security token services receive 208 conventional conversion information. Each such security token service operates independently of the others and at least one such security token service operates differently from the others, which means it is able to convert at least one source identity token to at least one target identity token the others cannot, with the others able to convert at least one source identity token to at least one target identity token that it cannot. The conversion information describes how to convert, for each of one or more types of conventional security tokens containing identity information (referred to herein as "identity tokens") that can be used to authenticate a user, into one or more different types of identity tokens for the same user. Each type of identity token may have a unique set of any or all of A) the type of content that identifies the user contained in token, B) the format of such information in the token, and C) the type of digital signature used to sign the token that the service can used to verify the identity token and thus the identity of the user.

In one embodiment, a type of signature may differ from another type because each type uses a different key, or there may be other differences as well. In one embodiment, the type of signature is indicated by the signing key name of that signature. The signing key name may indicate a source of the digital signature as well.

The type of content may differ because the content of one token includes a different aspect of the user's identity. For example one type may include a user-selected user identifier of that user, and another type may contain a social security number of that user.

The format may differ based on the order of the content and signature, or in the manner of representation of either, even if the content is in fact the same.

In one embodiment, for a given target signing key name, all of the conversions of an identity token to an identity token having any format and any content that result in that signing key name being used are processed by a security token service that corresponds to a single URL. Multiple machines may in fact be used to process such conversions, but processing by any of them would begin with a call to the same URL. A security token service may process conversions to other signing key names, but in one embodiment, conversions to a single signing key name will not be made using different URLs of different security token services unless each such security token service can process all conversions to the same signing key name.

In one embodiment, a map of signing key names to security token service URLs is provided 210. In another embodiment, no such map is provided, as the signing key name is specified using the URL of the security token service that converts into that signing key name.

In other embodiments, other arrangements may be used, and the arrangement used will cause the map received in step 210 to be organized consistently with the arrangement used in step 208. However, whatever arrangement is used, in one embodiment, a separate map of every possible "to" and "from" combination of various possible identity tokens is not employed.

For example, an original signing key name may be split into two new signing key names, with each of the two new signing key names having the same actual destination signing key name, but each corresponding to different combinations of source content, format and signing key names from which conversions could be made. This would allow two different security token services to be used to convert into the same actual signing key name, with each one corresponding to a different one of the two new signing key names.

One or more documents, such as conventional policies in conventional Web Services Policy Format, are provided and received 212 that describe the content, format and signing key name, of the one or more identity tokens used by each service that may use an identity token to authenticate a user. Each policy contains the name of the service, and describes for that service, the content, format and signing key name that the service is capable of using. A single service may be capable of using more than one such combination of content, format and signing key name, and in such case, all such combinations may be listed for that service. Other organizations of services may be used in each policy.

In one embodiment, the policy document in the Web services or other conventional format is self describing, allowing the location of the signing key name or names contained therein to be readily ascertained with certainty. The location of the content and format of the identity token may also be readily ascertained with certainty from the policy document. Once the location of these items have been ascertained, any requirements of the items themselves may then also be ascertained. For example, the policy document may include one or more minimum subsets of the XML node set from the identity token expected to be received by the requested service with the service request is order for the requested service to properly and fully authenticate a user. The policy document may include one or more minimum subsets of the conventional X.500 attribute set from the signing key name expected to digitally sign the identity token. The self describing format is in contrast to web services descriptions or other unformatted text descriptions, which may include free-form text, making the exact location of any signing key name either impossible to ascertain or impossible to ascertain with certainty. For example, a web service description cannot be scanned to look for signing key names, because it may contain an admonition that a particular signing key name was not used, and thus merely locating one of several signing key names in such a document does not provide any certainty that such a signing key name was used, so it is impossible to identify the signing key name with certainty using such a description.

A request for a service is received 214, the service specifying an application program or a function supplied by an application program, along with an identity token. In one embodiment, the request and/or identity token is made in a self describing format, such as XML, so that the content, format and signing key information of the identity token is ascertainable from the request. Other embodiments contain explicit information as part of the request that identifies the content, format and signing key name of the identity token, such as information that may be used with a look up table that matches the requestor with the content, format and signing key name it provides.

In one embodiment, the entity from which the request and token are received is a service different from the one requested, and the entity from which the request was received may be a different service that made use of the security token to authenticate the user and provide the different service, which may be provided before or after it provides the identity token. The different service provided may have been a function of the user corresponding to the identity token. In one embodiment, the identity token contains information elicited from, and provided manually by, the user (which may have been provided to the first service from which the identity token was received, or a different service before the first service provided the identity token), for example, via a web user interface or telephone user interface, and in another embodiment the token itself was converted from another token that contained such manually-provided, user-provided information.

In one embodiment, the request contains an identifier of the service being requested. This identifier is used to locate the policy to which the service being requested corresponds. The policy is used to retrieve the one or more combinations of any or all of the content, format and signing key name the service can use, and then the identity token description contained therein is used to determine whether the identity token matches or otherwise corresponds to the content and format of the identity tokens the requested service can use. In one embodiment, matching includes verification that at least one of the one or more XML node sets in the policy is a subset of the XML node set in the identity token received, and that the corresponding X.500 attribute set in the policy also is a subset of the identity token signing key X.500 attribute set of the received identity token.

If such a match or a correspondence occurs 218, the identity token received and the request are provided 220 to the requested service.

If there is no such match or correspondence 218, the policy is used to identify the URL of the security token service that can convert the token in the format received into the format that can be used by the requested service. To perform this function, the signing key name, or one of the signing key names that the service can use is selected (e.g. at random, by selecting the first one, or using an order of preference received from a system administrator) and if the signing key name is the URL, then such selection completes the identification of the URL, and otherwise, the map received in step 210 is used to identify the URL from the signing key name.

If no such security token service can be identified as described above 232, for example, because no policy applies, or a URL or security token service is not specified in the policy, an error message is returned 234 to the entity from which the request was received. The source IP address of the request may be used to return the error message to the entity from which the request was received.

Otherwise 232, the identity token, and an indication of the content, format and signing key name desired (such indication may be an identifier of the requested service or an identifier of or copy of some or all of the Web Service's policy describing identity token requirements of the requested service, or if there is more than one such policy, the identifier of, or copy of some or all of, the policy corresponding to the selected signing key name) are provided 236 to the identified security token service, optionally, along with some or all of the request, which uses conventional techniques to convert 238 the identity token into a different identity token having any or all of different content, a different format, or a different signature or signing key name than the token received with the request, and returns the new identity token, which is received 240. The security token service may have access to the one or more policies described above, or copies of the pertinent policies, to allow it to determine which of the contents, formats and signing key names to which it may convert the identity token, it should use.

In one embodiment, one security token service is at least an instance of the conventional TIVOLI FEDERATED IDENTITY MANAGER Product, commercially available from INTERNATIONAL BUSINESS MACHINES (IBM). To configure such service to perform conversions, in one embodiment, such product is provided with A) the name of a JAVA class that parses a received identity token (which is or includes, in one embodiment, at least a part of a security token), B) optionally the name of a JAVA class that changes the content, format or both of a user's identity, and C) the name of a JAVA class that issues (i.e. by creating and digitally signing) an identity token (which the TIVOLI product would consider a security token) in a particular format. The classes may be defined to perform the functions required.

The different identity token and the request are provided to the requested service, and the requested service uses the different identity token to authenticate the user and provides the requested service 244, without asking the user for any additional information to authenticate himself or herself. The service provided may be a function of the identity of the user, for example, providing an account balance for that user.

System.

Figure 3:
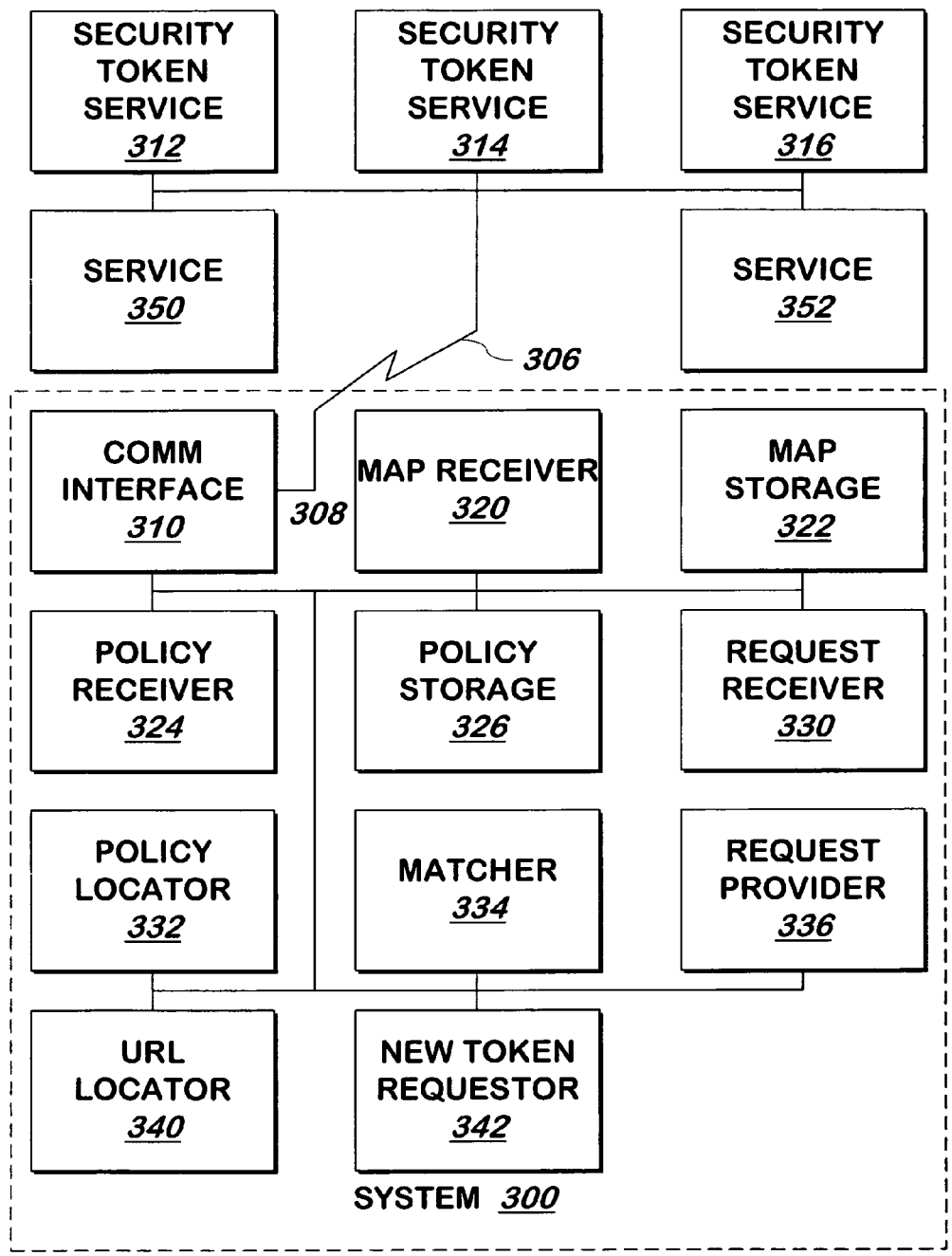
FIG. 3 is a block schematic diagram of a system for providing identity information according to one embodiment of the present invention.

Referring now to FIG. 3, a system 300 for providing identity tokens is shown according to one embodiment of the present invention. Conventional security token services 312-316 work in conjunction with system 300 to provide identity tokens as described herein to service 352 when requested from service 350. A service 350, 352 may be any conventional computer program or a portion of a computer program that performs a function. Each of these 312-316 and 350, 352 has a conventional communication interface similar or identical to communication interface 310 described below, coupled to a network 306, such as an Ethernet network coupled to the Internet as described below.

Communication interface 310 includes a conventional communication interface, running conventional communication protocols, such as TCP/IP, Ethernet, or both. All communication with system 300 is made via input/output 308 of communication interface 310, which may be coupled to a network 306, such as an Ethernet network, the Internet or both.

Each security token service 312-316 receives from a programmer identity token conversion information as described above. Optional map receiver 320 receives from a system administrator the map of signing key names to the URL of the security token service that can convert an identity token to a different identity token having that signing key name, and stores the map it receives into map storage 322.

Policy receiver 324 receives from a system administrator one or more policy documents as described above and stores these policies into policy storage 326. In one embodiment, a policy document corresponds to a service that can be requested, though other arrangements of policy documents to services that can be requested may be used.

Request receiver 330 receives requests from services 350, 352 that are intended for the other service 352, 350, respectively. Although only two services 350, 352 and three security token services 312-316 are shown, any number of these may be used. The remainder of the description herein describes the instance in which a request is received from service 350 intended for service 352, but requests may be received from service 350 for other services not shown or from any service to any other service.

Request receiver 330 receives from service 350 a request that designates service 352 and includes an identity token as described above. Request receiver 330 packages some or all of the request, including sufficient information to identify the service 352 requested, and some or all of the identity token into a request record, internally stores the request record, and provides a pointer to the request record to policy locator 332.

When it receives the pointer to the request record, policy locator 332 identifies the policy stored in policy storage 326 that corresponds to the service 352 requested in the request record, and adds a pointer to the policy to the request record, and provides the pointer to the request record to matcher 334.

When it receives the pointer to the request record, matcher 334 compares the content, format and signing key name of the identity token in the request record to the one or more sets of content, format and signing key name of the policy corresponding to the pointer in the request record.

To identify the content, format and signing key name of the identity token, in one embodiment, matcher 334 parses some or all of the attribute names and values of the identity token.

For a given requested service, there may be one or more sets of content, format and signing key name in the policy. Matcher 334 attempts to match the content, format and signing key name in the identity token in the request record corresponding to the pointer it receives, with any of the sets for the requested service in the policy document corresponding to the request record. In one embodiment, matcher 334 attempts to match each set in the policy document independently of any of the other sets that may be in the policy document. For a given set, matcher 334 considers a match to occur if the names of the contents in the identity token in the request record match or correspond (using a table of synonyms it maintains, having been received from a system administrator) to the names of the contents specified in that set of the policy document, the signing key name in the identity token in the request record matches or corresponds to the signing key name in that set of the policy document, and indications of how the identity token in the request record is (or was, upon receipt) formatted match or correspond to the indications of formatting in that set in the policy document. Formatting may be considered to match if the order of the content is the same, or if attributes of the content relating to formatting correspond, or using other conventional methods of formatting matching or correspondence.

In one embodiment, matcher 334 determines a match has occurred if it verifies that at least one of the one or more XML node sets in the policy corresponding to the pointer it receives is a subset of the XML node set in the identity token of the request record of the received pointer, and that the corresponding X.500 attribute set in the policy also is a subset of the identity token signing key X.500 attribute set of the identity token in the request record.

If matcher 334 determines that a match has occurred, matcher 334 optionally identifies any or all of the matches that occurred (e.g. by adding to the request record one or more identifiers in the policy document corresponding to the set or sets that matched) and provides the pointer to the request record to request provider, which provides the request and the identity token from the request record to service 352, which performs the service it provides, which is different from the service which may have been provided by service 350.

If matcher 334 does not determine that such a match has occurred, matcher 334 provides the pointer to the request record to URL locator 340.

When it receives the pointer to the request record, URL locator identifies the signing key name, or, as described above, one of the signing key names in the policy document (which may contain more than one policy) pointed to the by the request record corresponding to the pointer it receives, and, using the signing key name, identifies the URL of the security token service and adds the URL to the request record. To identify the correspondence, in one embodiment, URL locator 340 looks up the signing key name in the map in map storage 322 and locates the corresponding URL from the map. If URL locator 340 is not able to locate or identify a URL corresponding to one set of content, format and signing key name in the policy document that matched, URL locator 340 may attempt to locate or identify a URL corresponding to a different set that may have matched as set forth in the request record.

In one embodiment, the identification of the URL is performed solely responsive to the remainder of the request received and the identity token received. No other portion of the request or the identity token is used to identify the URL (or the security token service 312-316 to which that URL corresponds) in such embodiment.

If it cannot locate any such URL, URL locator 340 provides the request record to request receiver 330, which responds to the requestor (in the example used herein, service 350) with an error message, using the IP address of the requestor that either it retained when the request was received or it added to the request record.

If it can locate the URL, URL locator 340 adds the URL to the request record and optionally adds to the request record an indicator of the content, format and signing key corresponding to that URL that was used to obtain the URL as described above, and provides the pointer to the request record to new token requestor 342. The indicator may be an identifier of the content, format and signing key name in the policy document itself, an identifier of the policy document, or any of these. In one embodiment, the policy document may contain multiple policies that may apply to the requested service, with each policy containing one set of content, format and signing key, and the indicator is the identifier of the policy corresponding to the signing key selected as described above.

When it receives the pointer, new token requestor 342 provides the identity token from the request record and an identifier of the service in the request, the indicator identified by URL locator 340, or an identifier of the content, format and optionally the signing key name identified by URL locator 340 in the request record as described above, to the URL specified in the request record to one of the multiple security token services 312-316 corresponding to the URL in the request record corresponding to the pointer it received. Such security token service converts the identity token in the manner of a security token, and returns the new identity token to new token requestor 342. New token requestor 342 substitutes in the request record the new identity token for the one received, and provides the request record to request provider 336, which provides the request and the identity token from the request record to the service requested (in the example, to service 352), which processes it as described above.

What is claimed is:

1. A method of providing an identity token, the method comprising:
    receiving at least one document specifying at least one signing key name describing a source of digital signatures that each of a plurality of services can use to verify a user's identity;
    receiving a first identity token comprising a first set of content that identifies a user, and a digital signature comprising a first signing key name, the first identity token having a first format, and also receiving a request for one of the plurality of services;
    identifying, responsive to the request and at least one of the at least one document, at least one second signing key name used by one of the plurality of services corresponding to a service requested in the request;
    identifying, responsive to the at least one second signing key name, at least one of a plurality of security token services that can convert the first identity token into a second identity token having at least one selected from:
    a second content, different from the first content, that specifies the user;
    a second format, different from the first format, that the service requested by the request is able to use; and
    the second signing key name, different from the first signing key name, that the service requested in the request can use to verify the second identity token;
    providing to the at least one of the plurality of security token services identified, the first identity token and an indicator corresponding to the request or at least part of the request;
    receiving from the at least one of the plurality of security token services the second identity token; and
    providing at least part of the request and the second identity token in the second format to service provider corresponding to the request for use in authenticating the user.

2. The method of claim 1, wherein the identifying the at least one of a plurality of security token services is performed solely, with respect to a remainder of the request and the identity token, responsive to the second signing key name.

3. The method of claim 1, wherein the at least one security token service identified comprises one security token service.

4. The method of claim 1, wherein the document is in a machine readable format that allows the location of the signing key name to be specifically ascertained.

5. The method of claim 1, additionally comprising:
    determining whether the content, format and signing key name of the first identity token match at least one content, format and signing key name that can be used by the second service;
    responsive to the determining step determining that the content, format and signing key name of the first identity token being determined to match the at least one content, format and signing key name that can be used by the second service, providing the first identity token to the second service; and
    wherein the second identifying step, both providing steps and the second receiving step of claim 1 are responsive to the content, format and signing key name of the first identity token being determined not to match at least one content, format and signing key name that can be used by the second service.

6. The method of claim 1, wherein the first service used the first identity token to verify the user's identity.

7. The method of claim 1, wherein the first service received at least some of the information in the first identity token via manual input from the user.

8. A system for providing an identity token, the system comprising:
    a policy receiver having an input for receiving at least one document specifying at least one signing key name describing a source of digital signatures that each of a plurality of services can use to verify a user's identity, the policy receiver for providing the at least one document at an output;
    a request receiver having an input for receiving a first identity token comprising a first set of content that identifies a user, and a digital signature comprising a first signing key name, the first identity token having a first format, and also receiving a request for one of the plurality of services, the request receiver for providing at an output at least a portion of the first identity token and at least a portion of the request;
    a matcher having an input coupled to the request receiver output, for receiving the at least the portion of the first identity token and the at least the portion of the request, and to the policy receiver for receiving the at least one document, the matcher for identifying and providing at an output, responsive to the request and at least one of the at least one document, at least one second signing key name used by one of the plurality of services corresponding to a service requested in the request;
    a URL locator having an input coupled to the matcher output for receiving the at least one second signing key name, the URL locator for identifying, responsive to the at least one second signing key name, and for identifying, and providing at an output an identifier of, at least one of a plurality of security token services that can convert the first identity token into a second identity token having at least one selected from:
    a second content, different from the first content, that specifies the user;
    a second format, different from the first format, that the service requested by the request is able to use; and
    the second signing key name, different from the first signing key name, that the service requested in the request can use to verify the second identity token;
    a new token requestor having an input coupled to the URL locator output for receiving the identifier of the identifier of the at least one of the plurality of security token services, and to the request receiver output for receiving at least the portion of the identity token and at least the portion of the request, the new token requestor for providing at an input/output coupled to the at least one of the plurality of security token services corresponding to the identifier received at the new token requestor input, the at least the portion of the first identity token and an indicator corresponding to the request or at least the portion of the request, and for receiving from the at least one of the plurality of security token services the second identity token and for providing at an output at least a portion of the second identity token; and
    a request provider having an input coupled to the new token requestor output for receiving the at least the portion of the identity token, and to the request receiver output for receiving the at least the portion of the request, the request provider for providing at an output the at least the portion of the request and the at least the portion of the second identity token in the second format to the service provider corresponding to the at least the portion of the request for use in authenticating the user.

9. The system of claim 8, wherein the URL locator identifies the at least one of a plurality of security token services solely, with respect to a remainder of the request and the first identity token, responsive to the second signing key name.

10. The system of claim 8, wherein the at least one security token service identified comprises one security token service.

11. The system of claim 8, wherein the document is in a machine readable format that allows the location of the signing key name to be specifically ascertained.

12. The system of claim 8, wherein:
the matcher is additionally for determining whether the content, format and signing key name of the first identity token match at least one content, format and signing key name that can be used by the second service as set forth in the document, and responsive to determining that such a match has occurred, providing at the matcher output at least a portion of the first identity token to the request provider input;
the request provider is additionally for, responsive to receipt of the first identity token, providing the first identity token and the at least the portion of the request to the second service.

13. The system of claim 8, wherein the first service used the first identity token to verify the user's identity.

14. The system of claim 8, wherein the first service received at least some of the information in the first identity token via manual input from the user.

15. A computer program product comprising a non-transitory computer useable medium having computer readable program code embodied therein for providing an identity token, the computer program product comprising computer readable program code devices configured to cause a computer system to: receive at least one document specifying at least one signing key name describing a source of digital signatures that each of a plurality of services can use to verify a user's identity; receive a first identity token comprising a first set of content that identifies a user, and a digital signature comprising a first signing key name, the first identity token having a first format, and also receiving a request for one of the plurality of services; identify, responsive to the request and at least one of the at least one document, at least one second signing key name used by one of the plurality of services corresponding to a service requested in the request; identify, responsive to the at least one second signing key name, at least one of a plurality of security token services that can convert the first identity token into a second identity token having at least one selected from: a second content, different from the first content, that specifies the user; a second format, different from the first format, that the service requested by the request is able to use; and the second signing key name, different from the first signing key name, that the service requested in the request can use to verify the second identity token; provide to the at least one of the plurality of security token services identified, the first identity token and an indicator corresponding to the request or at least part of the request; receive from the at least one of the plurality of security token services the second identity token; and provide at least part of the request and the second identity token in the second format to service provider corresponding to the request for use in authenticating the user.

16. The computer program product of claim 15, wherein the computer readable program code devices configured to cause the computer system to identify the at least one of a plurality of security token services are responsive solely, with respect to a remainder of the request and the identity token, responsive to the second signing key name.

17. The computer program product of claim 15, wherein the at least one security token service identified comprises one security token service.

18. The computer program product of claim 15, wherein the document is in a machine readable format that allows the location of the signing key name to be specifically ascertained.

19. The computer program product of claim 15, additionally comprising computer readable program code devices configured to cause the computer system to: determine whether the content, format and signing key name of the first identity token match at least one content, format and signing key name that can be used by the second service; responsive to the computer readable program code devices configured to cause the computer system to determine that the content, format and signing key name of the first identity token being determined to match the at least one content, format and signing key name that can be used by the second service, provide the first identity token to the second service; and wherein the second computer readable program code devices configured to cause the computer system to identify, both computer readable program code devices configured to cause the computer system to provide and the second computer readable program code devices configured to cause the computer system to receive of claim 15 are responsive to the content, format and signing key name of the first identity token being determined not to match at least one content, format and signing key name that can be used by the second service.

20. The computer program product of claim 15, wherein the first service uses the first identity token to verify the user's identity.

21. The computer program product of claim 15, wherein the first service receives at least some of the information in the first identity token via manual input from the user.

* * * * *